US006819655B1

(12) United States Patent
Gregson

(10) Patent No.: US 6,819,655 B1
(45) Date of Patent: Nov. 16, 2004

(54) SYSTEM AND METHOD OF ANALYZING NETWORK PROTOCOLS

(75) Inventor: J. Michael Gregson, Encinitas, CA (US)

(73) Assignee: Applied Digital Access, Inc., San Diego, CA (US)

( * ) Notice: Subject to any disclaimer, the term of this patent is extended or adjusted under 35 U.S.C. 154(b) by 0 days.

(21) Appl. No.: 09/188,923

(22) Filed: Nov. 9, 1998

(51) Int. Cl.[7] .......................... G01R 31/08; H04L 12/66; H04L 12/50; H04J 3/16
(52) U.S. Cl. ..................... 370/242; 370/352; 370/357; 370/469; 714/27
(58) Field of Search ................................ 370/252, 242, 370/241, 248, 465–467, 400, 401, 352, 395, 392, 362, 522, 539, 469, 463, 357; 709/203, 218, 223, 249, 220, 230; 717/11; 714/27

(56) References Cited

U.S. PATENT DOCUMENTS

| 5,282,194 | A | * | 1/1994 | Harley et al. ................. 370/17 |
| 5,375,126 | A | | 12/1994 | Wallace ....................... 371/20.1 |
| 5,481,548 | A | | 1/1996 | Wallace ....................... 371/20.1 |
| 5,528,748 | A | * | 6/1996 | Wallace ................... 395/183.01 |
| 5,581,228 | A | * | 12/1996 | Cadieux et al. .......... 340/146.2 |
| 5,799,017 | A | * | 8/1998 | Gupta et al. ................. 370/419 |
| 5,802,142 | A | * | 9/1998 | Browne ........................ 379/28 |
| 5,812,529 | A | * | 9/1998 | Czarnik et al. ............. 370/245 |
| 5,850,388 | A | * | 12/1998 | Anderson et al. ........... 370/252 |
| 6,285,683 | B1 | * | 9/2001 | Lin .............................. 370/466 |
| 6,289,378 | B1 | * | 9/2001 | Meyer et al. ................ 709/223 |

FOREIGN PATENT DOCUMENTS

| DE | 195 21 485 A | 12/1996 |
| WO | WO 98/21845 | 5/1998 |

OTHER PUBLICATIONS

Li, "Enclaves: Enabling Secure Collaboration Over the Internet", (Apr. 1997) IEEE Journal on Selected Areas In Communications, vol. 15, No. 3, pp. 567–575.
Li et al., "Protocol Architecture for Universal Personal Computing", (Oct. 1997), IEEE Journal on Selected Areas In Communications, vol. 15, No. 8, pp. 1467–1476.
White et al,, "Cooperating Security Managers: A Peer–Based Intrusion Detection System", (Jan./Feb. 1996) IEEE Network The Magazine of Computer Communications, vol. 10, No. 1, pp. 20–23.
Hekimian, Product Information Release *Introducing Hekimian's CenterOp Systems*, PIR 1181, Sep., 1998.
TTC Products, TTC NetAnalyst, available at www.ttc.com/products/html/p_list/netana2.html on Feb. 19, 1999.
Sundareswaran et al., Netanalyzer: A Retrospective Network Analysis Tool, (Int'l Journal of Computers and Applications vol. 19, No. 2, 1997), pp. 77–83.
Ritter et al., A Multipurpose Distributed LAN Traffic Monitoring Tool, (IEEE Network No. 3 Jul. 1987), pp. 32–39.
Larsen, A. K., All Eyes on IP Traffic, (Data Communications U.S. McGraw Hill Mar. 21, 1997), pp. 54, 56–60, 62.
Basil et al., Network Traffic Measurement of the X Window System, (IEEE vol. CONF. 13, 1994), pp. 148–155.

* cited by examiner

Primary Examiner—Duc Ho
(74) Attorney, Agent, or Firm—Knobbe Martens Olson & Bear LLP

(57) ABSTRACT

A method and system for analyzing a public switched communications network from a remote place via the public Internet. The system comprises an access device which collects data from one or more links in a public switched communications network. The system further includes a server computer which receives the collected data from the access device via a dedicated network or the Internet. The server computer executes one or more applications to perform protocol analysis based on the received data. A client computer executing a Web browser may be used to communicate with the server computer via the Internet and access the outcome of the protocol analysis.

21 Claims, 12 Drawing Sheets

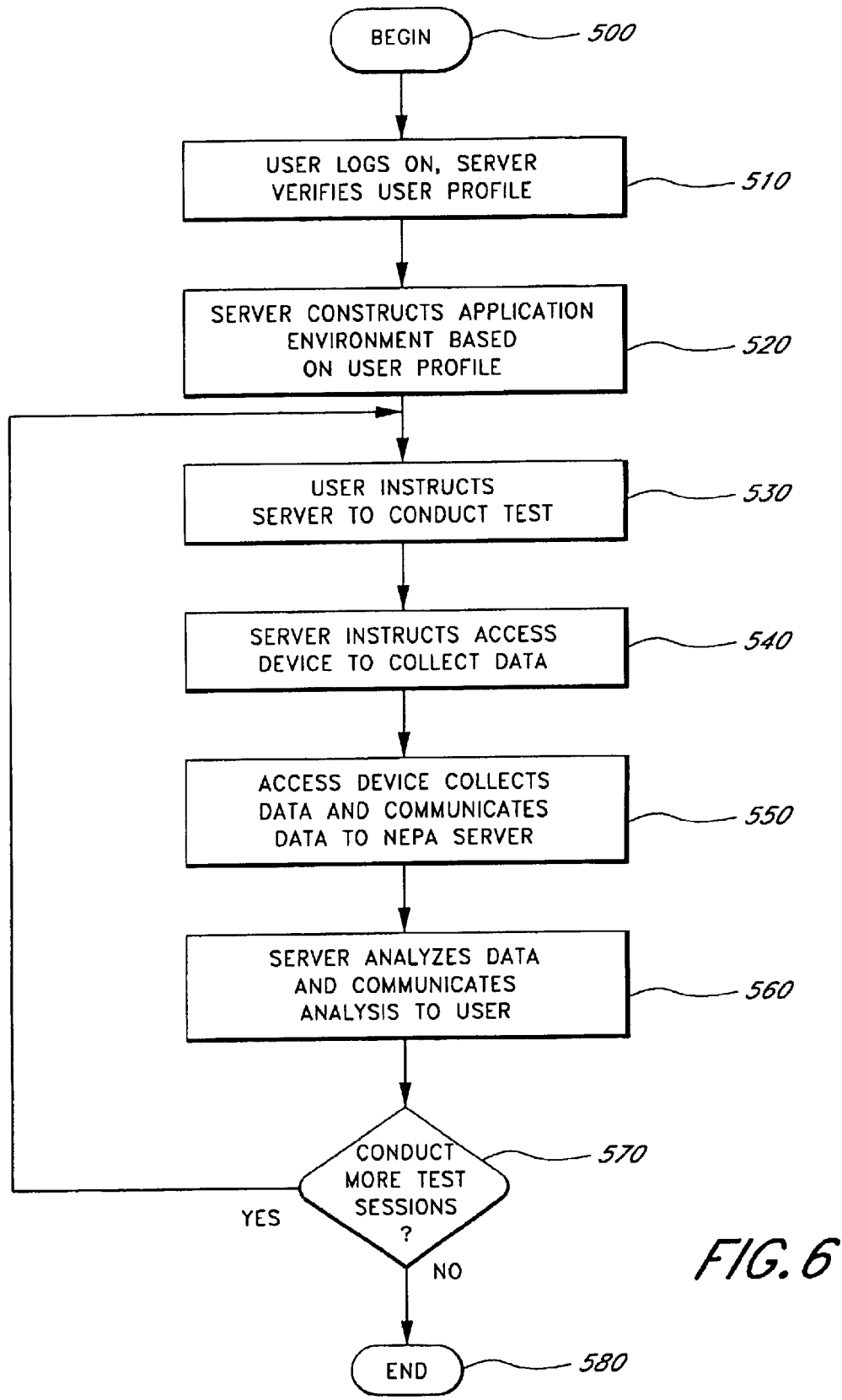

SYSTEM AND METHOD OF ANALYZING NETWORK PROTOCOLS

BACKGROUND OF THE INVENTION

1. Field of the Invention

The invention relates generally to accessing and testing communication networks. More particularly, this invention relates to remotely accessing, monitoring, and analyzing network protocols, such as used in public switched networks.

2. Description of the Related Technology

Current communication technology accommodates the transmission of voice, data, and video over multiple communication networks. The transmission standard employed by one communication network is often different than the standard employed by another. These standards include frame relay, asynchronous transfer mode (ATM), integrated services digital network (ISDN), fiber distributed data interface (FDDI), and Internet, for example. These transmission standards specify a variety of signal protocols, thereby requiring conversion of signals from one protocol to another, and vice versa.

Generally, a protocol refers to an agreed-upon format for transmitting data between two devices. The protocol determines, among other things, the type of error checking to be used, method of data compression, if any, and how a device indicates that it has finished sending or receiving a message. Several of the most significant protocols in use today are frame relay, ATM, ISDN, FDDI, and TCP/IP.

Frame relay is a packet-switching protocol for connecting devices on a wide area network (WAN). Frame relay networks support data transfer rates at 1.544 Megabits per second (Mbps) (also known as DS1 or T1 rate) and 44.736 Mbps (also known as DS3 or T3 rate). ATM is a packet-based network supporting data transfers between 25 and 622 Mbps. ATM offers a fixed point-to-point connection known as a "virtual circuit" (VC) between a source and destination. ATM is often transmitted over a physical medium known as a synchronous optical network (SONET) which employs fiber optic links. SONET defines a fiber optic transmission system offering optical channels from OC-1 at 51 Mbps to OC-96 at 4.8 Gigabits per second (Gbps).

ISDN is an international communications standard for sending voice, data, and video over digital telephone lines. ISDN requires special metal wires and supports data transfer rates of 64 kilobits per second (kbps). FDDI is a set of American National Standards Institute (ANSI) protocols for sending digital data over fiber optic cable. FDDI networks support data rates up to 100 Mbps. FDDI networks are typically used as backbones for WANs. Finally, data traffic on the largest public network in the world, the Internet, conforms to Transmission Control Protocol/Internet Protocol (TCP/IP) standard which is a suite of communication protocols for connecting host computers on the Internet.

An open systems interconnection (OSI) model is often implemented to facilitate the interoperability of systems conforming to different standards. The OSI model provides a widely accepted structuring technique called "layering" whereby the communications functions are partitioned into a hierarchical set of layers. Each layer performs a related subset of the functions required to communicate with another system. Ideally, the layers are defined so that changes in one layer do not require changes in other layers. The OSI model defines the following: physical, data link, network, transport, session, presentation, and application layers. The following is a brief description of the function and purpose of each layer.

The physical layer defines the transmission of unstructured bit streams over physical links, involving parameters such as voltage swings and bit durations. The data link provides reliability to the bit stream by defining error detection and control bits. The network layer is responsible for establishing, maintaining, and terminating connections across one or more networks between two communicating systems. The transport layer is responsible for maintaining proper sequence and error-free delivery of data between two communicating systems. The session layer controls the dialogue between two communicating systems by specifying discipline (e.g., half- or full-duplex), grouping of data, and checkpoint mechanism for recovering lost data. The presentation layer defines data formats exchanged between applications by offering a set of transformation services, such as compression or encryption. Finally, the application layer defines the mechanism of accessing the OSI environment to support the exchange of information between two or more applications, such as file transfer and electronic mail.

As the number of communication networks increases, so does the complexity of managing, maintaining, and troubleshooting a malfunction in these networks. FIG. 1 is a pictorial diagram depicting an exemplary scenario of a current network management procedure when a failure occurs. Typically, upon experiencing a failure in service, at block 110, a network user contacts a network operation center and complains about the loss in service. A network user may be any organization or entity, such as a bank, which uses or leases one or more communication links from one or more network providers, such as a telephone company. At block 120, the network operations center dispatches a technician(s) to the site of the suspect transmission lines to determine if a problem exists in the physical layer of transmission. The physical transmission layer generally refers to the OSI physical layer, including the specification of wiring, cables, connectors, switches, and other similar physical components which make up the physical transmission path.

At block 130, if the technician detects a problem in the physical layer, the physical component is repaired. However, if the technician does not detect a problem in the physical layer, specialized technicians with protocol analyzers are dispatched to determine if a defect exists in the logical layer of transmission (block 140). Generally, the logical transmission layer refers to the OSI data link, network, transport, session, presentation, and/or application layers. More particularly, the logical transmission layer refers to the OSI data link, network, and/or transport layers. At times, the specialized technicians may have to communicate several times, back and forth, with the technicians at the physical layer before they can determine and isolate the problem. Possibly many hours later, the network operations center notifies the network user of the nature of the problem and time needed to restore normal network operation (block 150). Once the problem is determined, an appropriate fix to hardware or software is made to correct the problem which caused the failure in transmission.

As shown in the above exemplary scenario, isolating and correcting a malfunction in a multiprotocol network may be a very time consuming process involving multiple levels of expertise. During this process, actual examination of a link at multiple locations may be necessary to isolate the source of the malfunction in the network. Moreover, the network user's operation is shut down or, in some cases, transferred to more costly back-up solutions. In troubleshooting a network, the network provider is often compelled to dispatch technicians with expensive, bulky testing units to determine where a problem may exist in the network, thereby making network maintenance costly and inefficient.

Therefore, there is a need in communications network technology to provide network providers with the ability to maintain and troubleshoot their network in an efficient and cost-effective manner.

SUMMARY OF THE INVENTION

To overcome the limitations of the prior art, the invention provides a system for analyzing a first communications network. The system comprises a device collecting data from the first network, and a server computer in data communication with the device via a second communications network. The server computer executes an application to analyze data protocol. The system further comprises a client computer configured for communicating with the server computer over the second communications network.

In another embodiment, the invention provides a system for restricting access of an operator to a communications network. The system comprises a device allowing access to at least one link in the communications network. The system further comprises a server computer configured for communicating with the device. The server computer has at least one network application and is configured to determine the at least one application and at least one link allowed for access by the operator. In another embodiment, the invention provides a system for analyzing a public switched communications network. The system comprises an access device collecting data from the public switched communications network, and a server computer receiving the collected data from the access device via the Internet. The server computer executes at least one application to perform protocol analysis based on the received data. The system further comprises a client computer executing a Web browser to communicate with the server computer via the Internet and access the outcome of the protocol analysis.

In another embodiment, the invention provides a method of analyzing a first communications network. The method comprises the steps of collecting data from at least one link in the first communications network, and performing a protocol analysis based on the at least one link using a server computer. The method further comprises the step of communicating the outcome of the protocol analysis to a client computer via a second communications network. In another embodiment, the invention provides a method of restricting access of an operator to a communications network. The method comprises the step of sending identification information of the operator to a server computer to execute at least one network application and perform a protocol analysis of at least one link in the communications network. The method further comprises the steps of verifying the identification information of the operator, and determining the at least one link and at least one network application allowed for access by the operator.

BRIEF DESCRIPTION OF THE DRAWINGS

Certain aspects, features and advantages of certain embodiments of the invention will be better understood by referring to the following detailed description, which should be read in conjunction with the accompanying drawings, in which:

FIG. 6 is a flowchart describing operational events during an exemplary test session by the system of FIG. 2.

DETAILED DESCRIPTION OF CERTAIN EMBODIMENTS

The following description is not to be taken in a limiting sense, but is made merely for the purpose of describing the general principles of the invention. The scope of the invention should be determined with reference to the claims.

Figure 1:
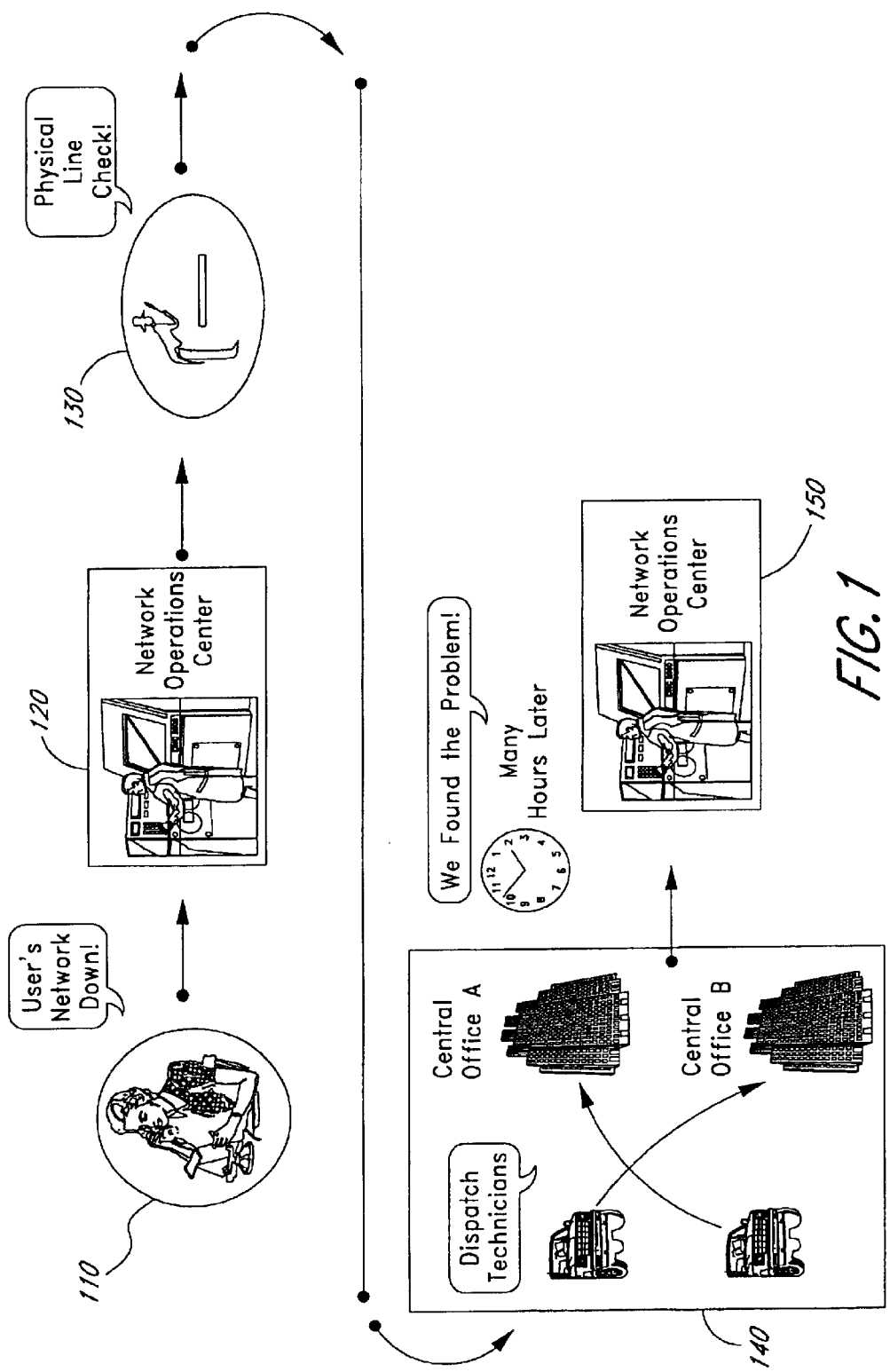
FIG. 1 is a pictorial diagram showing an exemplary scenario of current network management procedure.
Figure 2:
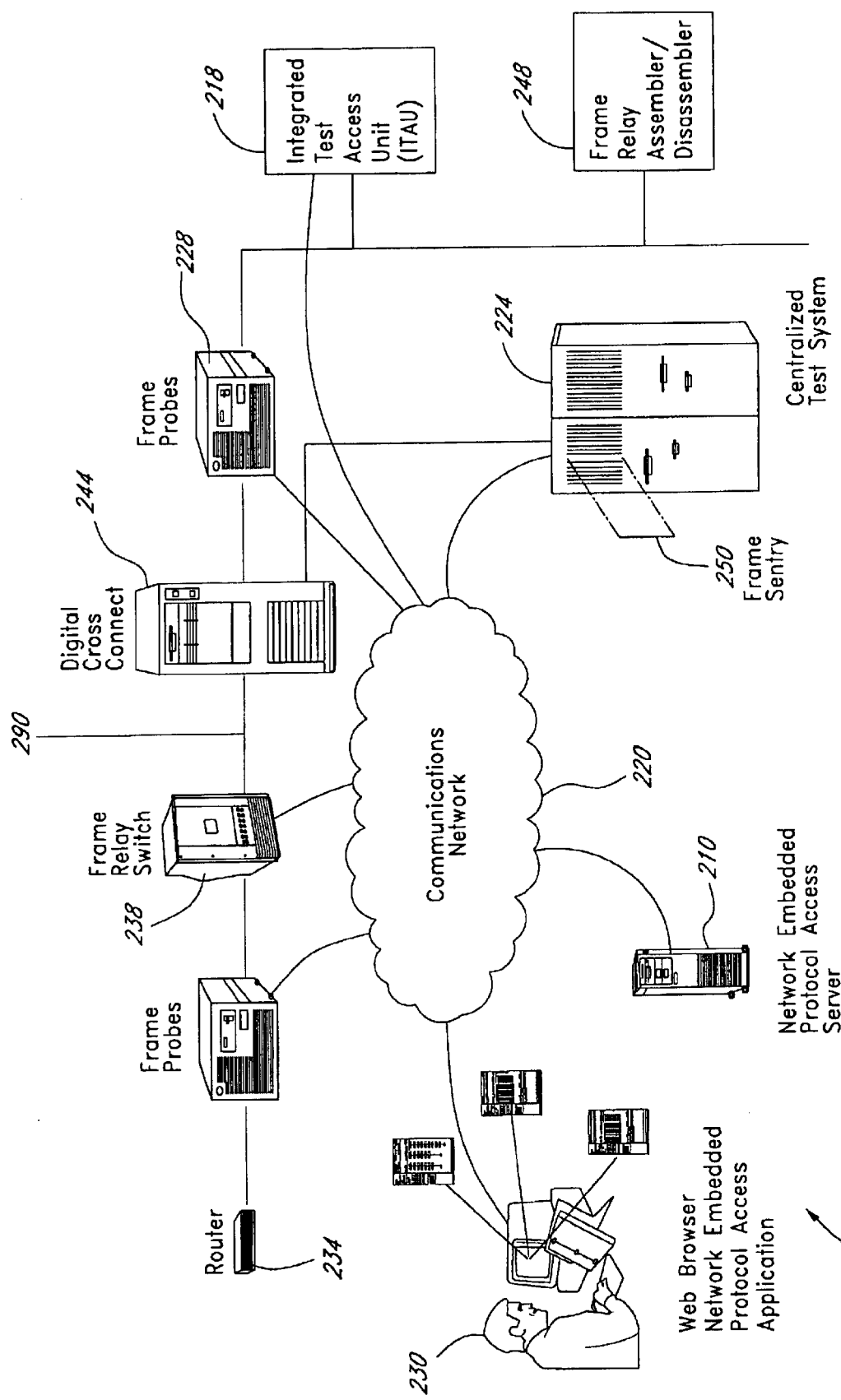
FIG. 2 is a block diagram of a network embedded protocol access (NEPA) system in accordance with the invention.

As noted above, the invention includes a system and method for analyzing operation and performance of a communication network. FIG. 2 is a block diagram of a network embedded protocol access (NEPA) system 200 in accordance with the invention. The NEPA system 200 provides network personnel the ability to efficiently monitor and analyze the performance of one or more communication networks, such as frame relay, ATM, and TCP/IP, for instance. The NEPA system 200 interfaces with two or more communications networks. The first communications network is the network under examination (NUE) 290. The second communications network is the communications network 220. The NEPA system 200 includes a NEPA server 210 connected to the communications network 220, which may comprise a dial-in connection, a private network, or the Internet. The communications network 220 allows the NEPA server 210 to communicate with and, particularly, collect diagnostic information from one or more access devices. Additionally, the communications network 220 allows the NEPA server 210 to communicate with a network maintenance center (NMC) 230 having one or more client computers. The network user may access, monitor and analyze the performance of its network remotely via the communications network 220, e.g., the Internet. The term "client" generally refers to a computer or workstation running an application which communicates with a server to perform some operations, as defined in a client-server architecture. Similarly, the term "server" generally refers to a computer or device which manages network resources to perform some operations for the client, as defined in a client-server architecture.

The access devices may be distributed at one or more sites at critical boundaries of the NUE 290. As noted above, the NUE 290 may be a frame relay, ATM, TCP/IP, or other similar communication networks. An access device provides the NEPA server 210 with access to, selection of circuits, and collection of data from the NUE 290. The access device provides a physical interface to the various North American standard telephone signals supported by the NEPA system 200, such as DS1, DS3, and SONET. However, other standards such as the European E1 and E3 signals are encompassed by the invention. The access device may connect to the NUE 290 either in-line or via a test access point such as a digital cross connect (DCS) 244. The access device may be any commercially available unit which is interoperable with the NEPA server 210. For example, the access device may be a frame sentry module 250 which may be installed in an integrated test access unit (ITAU) such as a T3AS 218 or a centralized test system (CTS) 224, manufactured by Applied Digital Access (ADA). The frame sentry 250 performs intrusive access of one or more network links. Additionally, the access device may be a frame probe 228 which is also manufactured by ADA. The frame probe 228 is a stand-alone unit which performs intrusive and non-intrusive access to one or more network links. The access device may also include any original equipment manufacture (OEM) device, such as a frame relay switch 234, router 238, a frame relay assembler/disassembler (FRAD) 248, which includes a NEPA access device, such as the frame sentry module 250. These OEM devices break a data stream into frames for transmission over a frame relay network, and recreate a data stream from incoming frames from the frame relay network.

Figure 3:
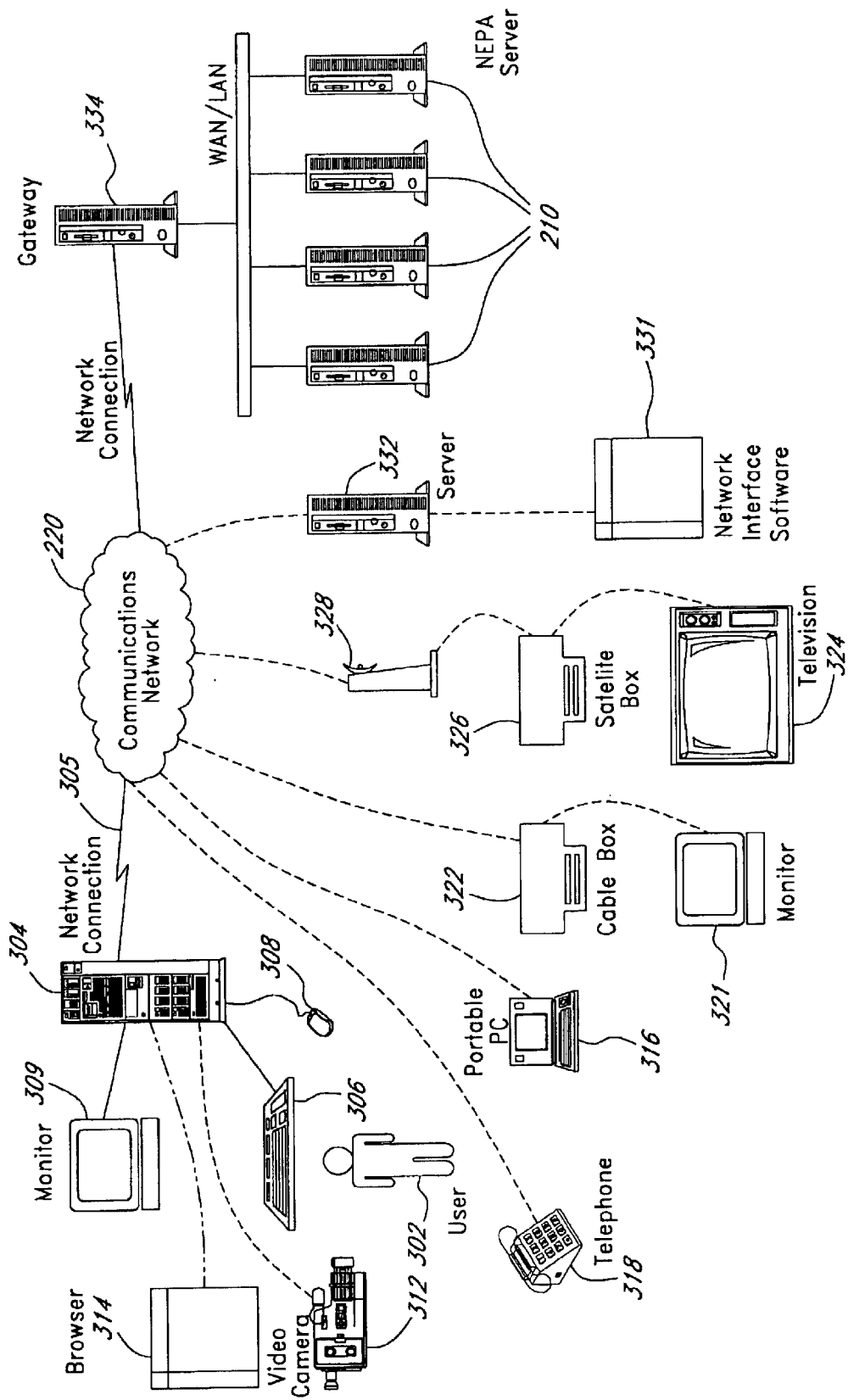
FIG. 3 is a block diagram of an exemplary communications network of FIG. 2.

FIG. 3 is a block diagram of an exemplary embodiment of the communications network 220 having one or more peripheral devices which may be used by the NEPA system 200. As shown in FIG. 3, a computer user 302 may connect to the network 220 using any of various computing devices. One possible interface device may be a computer 304 connected to the network 220 via a network connection 305. Typically, the network connection 305 is provided to the user 302 by a network service provider. In case of the Internet, for instance, the Internet service provider (ISP) may be a national service provider such as America On-Line (AOL), Microsoft Network (MSN), an educational or governmental institution, or a local service provider. The computer 304 may be, for example, any industry standard machine such as an IBM-PC (or compatible) or an Apple Macintosh. The computer 304 may also be a proprietary machine. The computer 304 may include a keyboard 306, a mouse 308, a monitor 309, and a video camera 312.

The user 302 may also use a network interface software 314 such as a Web browser (e.g., Microsoft Internet Explorer, or Netscape Navigator/Communicator), to communicate over the network 220. Alternatively, the user 302 may use a portable personal computer (PC) 316 or a telephonic device 318 equipped with proper network interface software to interface to the network 220. The user 302 may also use a monitor 321 connected to a cable box 322 equipped with proper network interface software to interface with the network 220. Furthermore, using a satellite (not shown), the user may employ a standard television set 324 connected to a satellite box 326 to communicate with the network medium through a satellite antenna 328. Finally, the user 302 may employ a network interface software 331 in a dedicated server 332 to communicate over the network 220. Accordingly, numerous variations in the type of interface equipment may be accommodated in applying this invention.

Using any of the above interface equipment, the user 302 may communicate with one or more NEPA servers 210. The NEPA servers comprise computing devices having large persistent memories such as multi-Gigabyte hard disk drives. The drives contain file resources which are accessible to the NMC 230 (FIG. 2). As noted in FIG. 3, the servers may be part of a local area network (LAN) or wide area network (WAN) connected via proper interface links (e.g., Ethernet). In fact, the functionality of the gateway computer 334 may be incorporated into the NEPA server 210.

Figure 4:
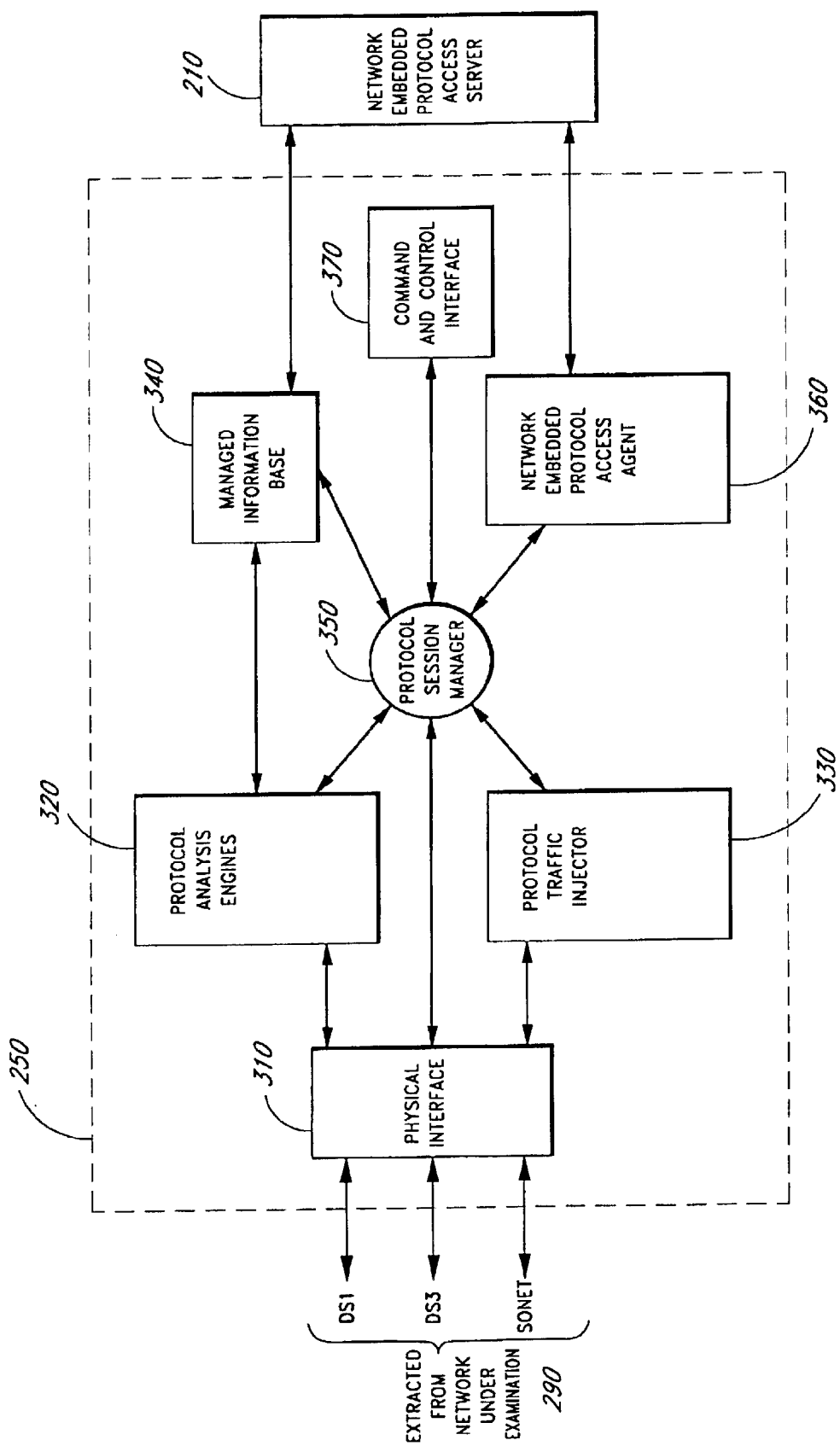
FIG. 4 is a functional block diagram of a NEPA access device used in the system of FIG. 2.

FIG. 4 is a functional block diagram of a NEPA access device used in the NEPA system 200. As noted above, the NEPA access device may comprise a frame sentry module 250, frame probe 228, or any network device which incorporates the functionality of a NEPA access device. In this embodiment, a description of the frame sentry 250 is provided to serve as a description of one embodiment of the NEPA access device.

As shown in FIG. 4, the NEPA access device may comprise one or more functional units. In this embodiment, the NEPA may comprise a physical interface 310 which provides the NEPA access device with the ability to interface with the NUE 290. The physical interface 310 accepts signals which conform to DS1, DS3, SONET, and other similar communication signals used in communication networks. The NEPA access device may further include one or more protocol analysis engines (PAE) 320 and one or more protocol traffic injector (PTI) 330 which communicate with the physical interface 310. The NEPA access device may further include a managed information base (MIB) 340 which communicates with the PTI 330 and PAE 320. The NEPA access device may also include a protocol session manager (PSM) 350 which coordinates and manages the operation of all components of the NEPA access device. The PSM 350 may use a NEPA agent 360 to communicate with the NEPA server 210. Finally, the NEPA access device may include a command and control interface (CCI) 370 which communicates to the PSM 350 control information from other components or boards of the system where the NEPA access device is installed. Each of the above functional units may reside alone or in combination with one or more other functional units as downloadable instructions (e.g., firmware) on one or more microprocessors.

The PAE 320 filters and collects desired protocol information from one or more circuits in the NUE 290 simultaneously. The PAE 320 may conduct protocol analysis on the collected data in in-line configurations. The PAE 320 stores the collected data into the MIB 340 or a dedicated RAM file for further processing. One PAE 320 may further support a variety of signal protocols including TCP/IP, Ethernet (e.g., IEEE 802.3), systems network architecture (SNA), frame relay, and ATM. The PAE 320 may further support a multiprotocol interconnect over frame relay and bridging protocols, as specified in the request for comments (RFC) 1490, published July 1993, which is incorporated by reference. The bridging protocols include 802.4 frame, FDDI frame, 802.6 frame, and protocol data unit (PDU) frame. Of course, other protocols may be analyzed by the access device 250. The type of protocol information to be decoded depends on the signal protocol of the NUE 290. For example, the PAE 320 may consider the IP address, DLCI number, virtual channel identifier (VCI), virtual path identifier (VPI), or other protocol-specific information.

The PTI 330 performs monitor, traffic emulation, and traffic injection functions for selected links of NUE 290. The PTI 330 injects traffic having a data link connection identifier (DLCI) form into the protocol stream of the link of NUE 290. For instance, the PTI 330 may inject a limited set of errors such as frame check sequence (FCS) or "o" bit stuffing errors. The PTI 330 specifies the start time, frequency and duration of a test pattern injection. Two basic methods are provided for specifying test frames for injection into frame relay. The first method requires the PTI 330 to specify a frame prototype and its accompanying data using TR_PROTO frame specification. As known in the protocol analysis technology, a frame relay frame includes an address field and an information field. The PTI 330 may inject traffic in the address field and information field. This frame specification format is useful if the PTI 330 is attempting to construct a frame test sequence from scratch, i.e., without any prior frame capture reference.

The second method requires the PTI 330 to specify only the raw data to be injected into the frame relay link using a TR_DATA frame specification. This form of test data specification is useful if the PTI 330 has collected a frame capture for use as a direct reference to injecting traffic. Multiple concurrent test data specifications having different start time, duration and frequency may be performed. Finally, it is desirable to have the NEPA server 210 perform these functions and, consequently, accordingly instruct the PTI 330 via the NEPA agent 360.

Although it is shown as a separate functional block, the MIB 340 is often integrated with the NEPA agent 360. In practice, the NEPA agent 360 comprises the MIB 340 and a WindNet simple network management protocol (SNMP) agent to communicate with the NEPA server 210 using SNMP via the communications network 220. The MIB 340 employs MIB rules defined by RFC 1155 titled "Structure and Identification of Management Information for TCP/IP-based Internets," published in May 1990, RFC 1212 titled "Concise MIB Definitions," published in March 1991, and RFC 1315 titled "Management Information Base for Frame Relay DTEs," published in April 1992, which are incorporated by reference. The MIB 340 typically stores the protocol information collected by the PAE 320. The MIB 340 makes such information available for transfer to the NEPA server 210 for analysis. Additionally, a RAM file may be used to store formatted protocol information. The NEPA server 210 retrieves formatted protocol information using file transfer protocol (FTP) for real-time display, storage in the NEPA server 210, or use by a particular NEPA application.

The NEPA agent 360 may communicate control commands with the NEPA server 210 using a control link, such as Ethernet, Telnet, or X.25, over a TCP/IP network such as the Internet. The NEPA agent 360 may configure the frame sentry 250 (e.g., assigns an IP address to allow operation over the TCP/IP network), communicates alarm and status information, and communicates frame relay protocol data unit (PDU) statistical information. The NEPA agent 360 may employ a common object request broker architecture (CORBA) link to communicate data with the NEPA server 210. CORBA is an architecture which allows pieces of programs or objects to communicate regardless of the programming language or operating system used by these programs.

The foregoing functional blocks of the NEPA access device represent merely one possible approach for designing the NEPA access device. After reviewing this disclosure, it will be apparent to those skilled in the protocol analysis technology that other design partitions may lead to other implementations of a NEPA access device. For example, two or more functional blocks (e.g., MIB 340 and NEPA Agent 360) may be combined into a single functional unit. All these possible variations fall within the scope of the invention.

Figure 5:
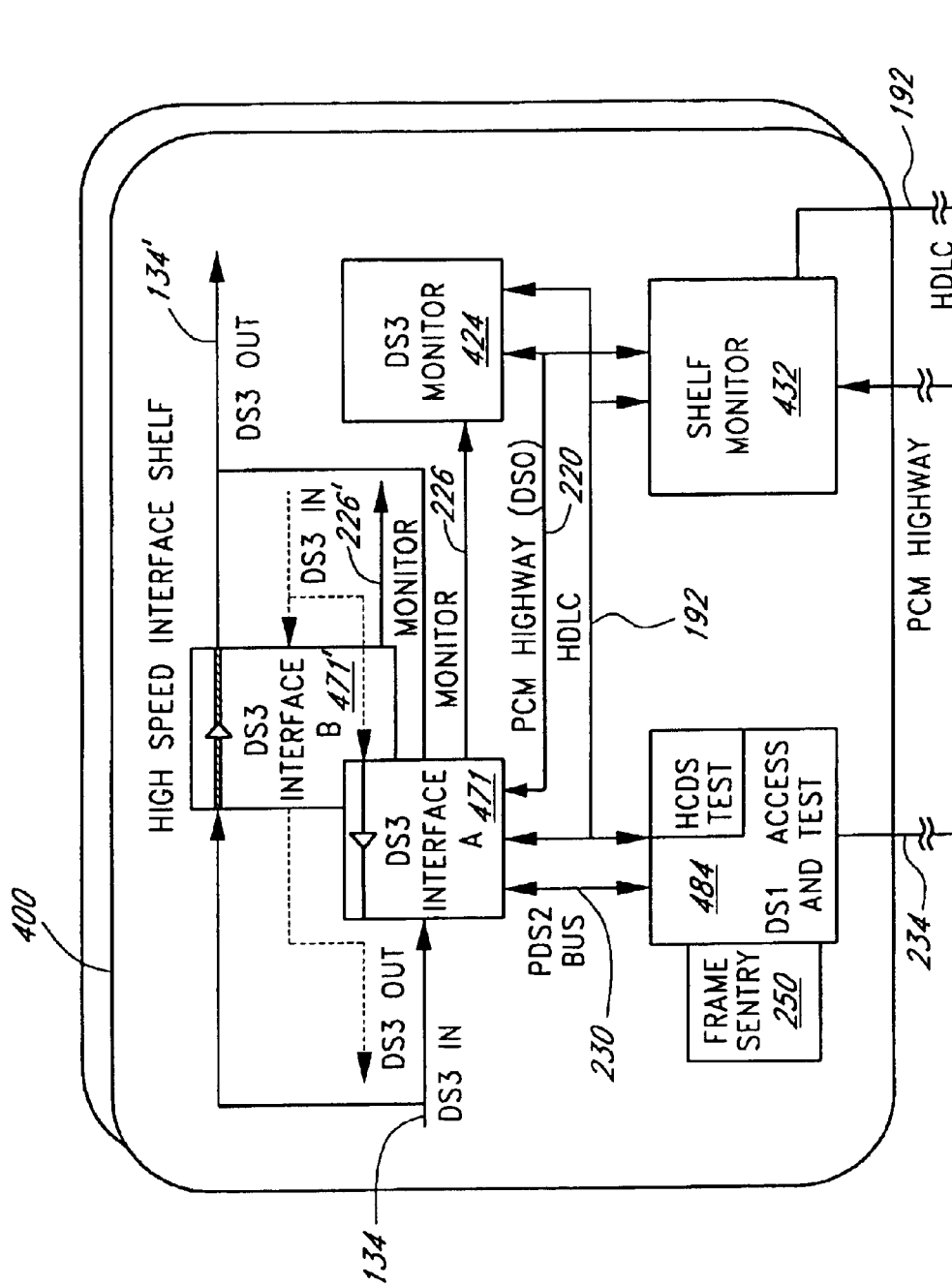
FIG. 5 is a functional block diagram showing integration of the frame sentry module in the test access unit of FIG. 2.

FIG. 5 is a functional block diagram showing the frame sentry 250 in an ITAU, such as the T3AS manufactured by ADA. The T3AS allows access to, monitoring of, and testing a network link. The ITAU comprises an administration shelf, a high-speed interface shelf, and a test resource shelf. As shown in FIG. 5, the frame sentry 250 may be integrated in the high-speed interface shelf (HSIS) 400. The HSIS 400 comprises one or more DS3 interface modules 471 are connected to a shelf monitor module 432 and a DS3 monitor module 424. The DS3 interface modules 471 receive DS3 signals for demultiplexing into DS1, DS0, and subrate channels. The shelf monitor module 432 connects to a DS1 Access/Test module 484 using a HDLC link 192. The DS1 Access/Test module 484 provides simultaneous testing of one or more DS1 channels. The DS1 Access/Test module 484 integrates the frame sentry 250 to perform the functions described in detail above.

The HSIS 400 supports interface to one or more signal lines, e.g., DS1 and DS3. Additionally, with the frame sentry 250, the high-speed interface shelf 400 supports interface to SONET signals, and other similar signals. For more information about the ITAU, reference is made to U.S. Pat. No. 5,691,976 issued to Engdahl et al., which is incorporated by reference.

FIG. 6 is a flowchart describing operational events during an exemplary test session by the NEPA system 200. In this embodiment, the Internet is used as the communications network 220 (FIG. 2). Typically, beginning with block 500, an operator at the network maintenance center (NMC) 230 commences a test session by accessing the Internet, using any commercially available world wide web browser, such Netscape Navigator or Internet Explorer. At block 510, the operator logs on to the NEPA server 210 using its IP address and the operator's access profile, such as a username and password. The NEPA server 2 10 verifies the access profile information and, if valid, authorizes access to Toolkit applications in the NEPA server 210 by displaying one or more applications to the operator at the NMC 230. The NEPA Toolkit is a collection of applications which permit the operator to collect data for generating network reports, troubleshoot a network, locate and isolate the source of a network malfunction, and conduct statistical analysis. The NEPA Toolkit applications include first glance, frame data, frame statistics, traffic emulation/injection, datascope, sectionalizer, and alarm handler. As explained in further details in FIG. 7, the type of applications displayed to the operator depends on the operator's authorized access level. These applications are described in details in later sections of this disclosure. Of course, other applications are made possible by the present invention.

Once the NEPA server 210 verifies the user profile information, the NEPA server 210 prepares the application tools to be displayed to the operator (block 520). In preparing the application tools, the NEPA server 210 determines, based on the user profile information, which tool and options the operator is authorized to access. The NEPA server 210 displays the accessible tools to the operator at the client computer at NMC 230. At block 530, the operator may command the NEPA server 210 to conduct one or more network analysis tasks. The operator may select an object type, a node location (i.e., TAP), and one or more circuits or links to be monitored, tested, or analyzed. Additionally, the operator may select the application or tool to run, duration of the test, protocol type, and frame filter to be used. Based on these selections, at block 540, the NEPA server 210 commands one or more NEPA access devices, such as the frame probe 228 or frame sentry 250, to access and collect data from the NUE 290. At block 550, the one or more NEPA access devices collect the desired data from the NUE 290, and forward the collected data to the NEPA server 210 for analysis.

As noted above, the communication link between the NEPA server 210 and NEPA access devices may be established using a dedicated link or the communications network 220, i.e., the Internet. At block 560, the NEPA server 210 analyzes the collected data, and forwards the data in analyzed form to the operator at the NMC 230 for display in accordance with the selected application. Once the operator receives the analyzed data, the operator may view the analysis on a visual display or print out a hard copy for monitoring or troubleshooting a malfunction in NUE 290. At block 570, the operator decides whether to conduct more tests on the NUE 290. If the operator desires to conduct more tests on the NUE 290, the process returns to block 530. If the operator desires to terminate the session with the NEPA server 210, the operator may terminate the session by logging off at block 580.

FIG. 7 is a flowchart describing steps executed by the NEPA server 210 of the NEPA system 200. As noted above, the NEPA server 210 is the processor of the NEPA system 200 which analyzes signal protocols. The NEPA server 210 is a highly flexible and adaptive Web server which allows easy upgrades and accommodates the addition of new software. The NEPA server 210 supports a variety of communications networks, including the Internet in which case an IP address is assigned to the NEPA server 210. The software of the NEPA server 210 may be executed, for example, on a UNIX or Windows NT platform. Application programs may be coded in Java, common gateway interface (CGI), or another programming script or language to support a user interface having an Internet browser, such as Netscape Navigator or Internet Explorer.

Java is a high-level programming language which may be executed or interpreted on most computers, because it is compatible with most operating systems, including UNIX, Macintosh OS, and MS Windows. Java application programs may be downloaded from a Web server (e.g., NEPA server 210) to run on a computer (e.g., NMC 230) having a Java-compatible browser, such as Netscape Navigator or Internet Explorer.

On the other hand, CGI is a specification for transferring information between a Web server and a CGI program. A CGI program is a program written in any programming language, such as C, Perl, Visual Basic, or Java, so long as the program accepts and returns data which conforms to the CGI specification. CGI programs are commonly used in Web client computers to allow Web servers to interact dynamically with Web users.

Beginning with block 600, the NEPA server 210 begins operation upon power-up or after a reset. As noted above, the NEPA server 210 may be located at any desired physical location selected by the maintenance operators. For example, if desired, the NEPA server 210 may be co-located with the NMC 230. At decision block 610, the NEPA server 210 determines if a test session requested command is received from a NMC 230. If no test session is requested, the NEPA server 210 continues to wait for a request for a test session. If a request for a test session is received, at block 620, the NEPA server 210 requests and verifies access profile information, such as a username and password.

The NEPA server 210 compares the profile information with a file or database containing pre-registered profile information. More particularly, the authorized usernames and passwords may be stored in a key-value ASCII file that is readable by a UserProfile module. In one embodiment, the file format is defined by a "users.profile" file located in the NEPA Toolkit source tree. Each user has an associated profile that defines the tools, tests, and selections (e.g., choice of a circuit) which the user may execute. More particularly, each user has a list of network devices, link addresses, and application programs which the user may access. The network devices may include the T3AS 218, FRAD 248, CTS 224, and frame probe 228. The link addresses generally include the network (e.g., IP) addresses of the NEPA access device, i.e., at the location of the circuit(s) to be tested in the NUE 290. As described in the following sections, the application programs include first glance, frame data, statistics, and datascope.

Accordingly, at block 630, the NEPA server 210 determines which NEPA applications, access devices, and links, to display and allow the operator to access on the computer at the NMC 230. To do so, the NEPA server 210 stores characteristics information of the NEPA access device, such as type (e.g., frame sentry or frame probe), location on the NUE 290, and available links. The NEPA server 210 stores these access device information in a series of ASCII files which correlate to each user profile. Hence, at block 640, the NEPA server 210 may apply the user profile information to determine if the operator is permitted to access a particular option. If the user is permitted to access the option, at block 650 the NEPA server 210 determines to display that option to the operator. On the other hand, if the operator is not permitted to access the option, then the process proceeds to determine accessibility of a next option. At block 650, the NEPA server 210 determines if more options are remaining for the application tool. If there are more options to consider, the NEPA server 210 returns to block 640. If no more options remain for the application tool, then the process proceeds to FIG. 7B. Hence, for a given operator, the NEPA server 210 correlates and determines which NEPA applications, access device, and link to display to the operator.

Figure 7A:
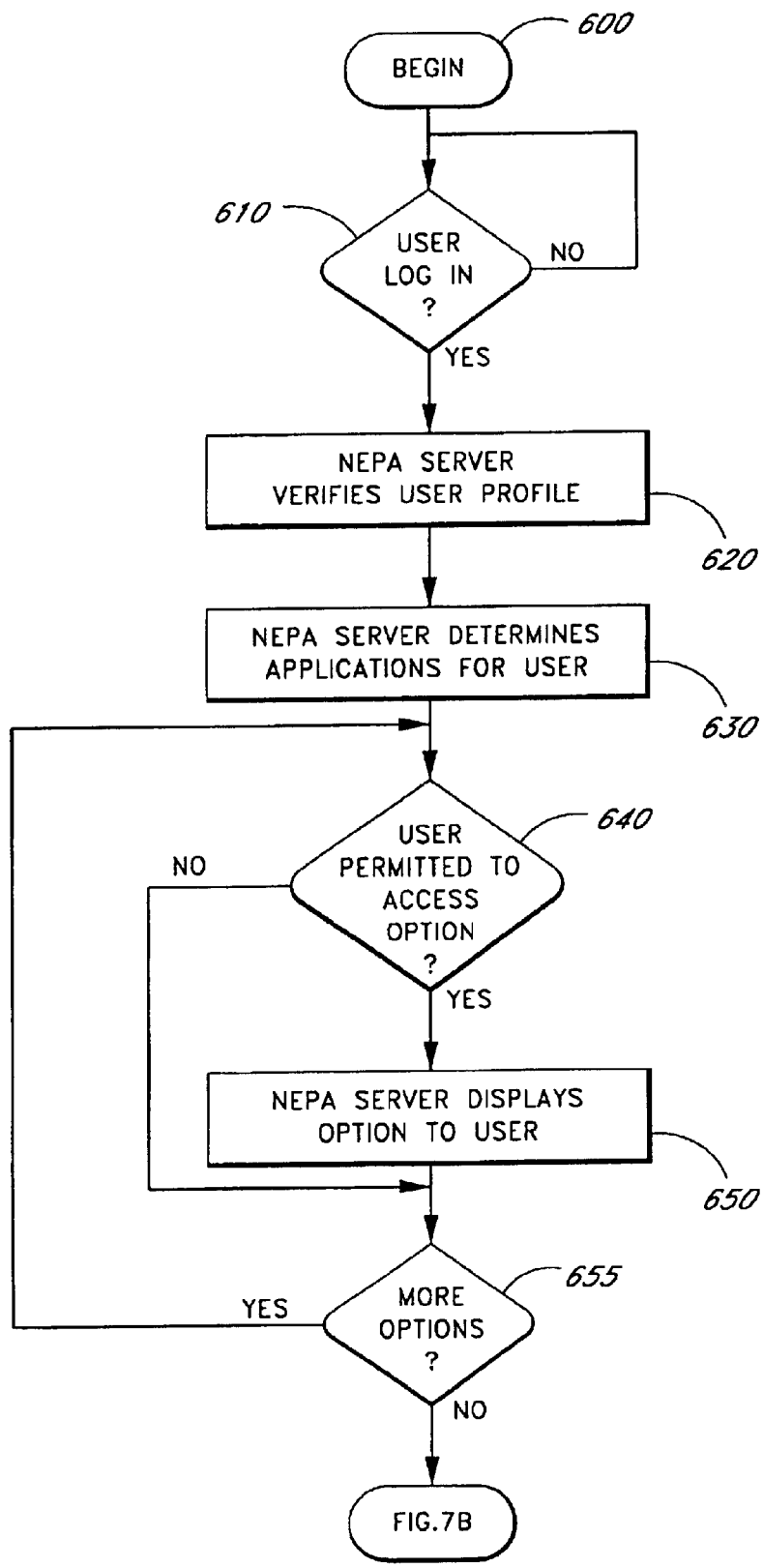
FIGS. 7A and 7B are a flowchart describing the control flow of the NEPA server of the system of FIG. 2.
Figure 7B:
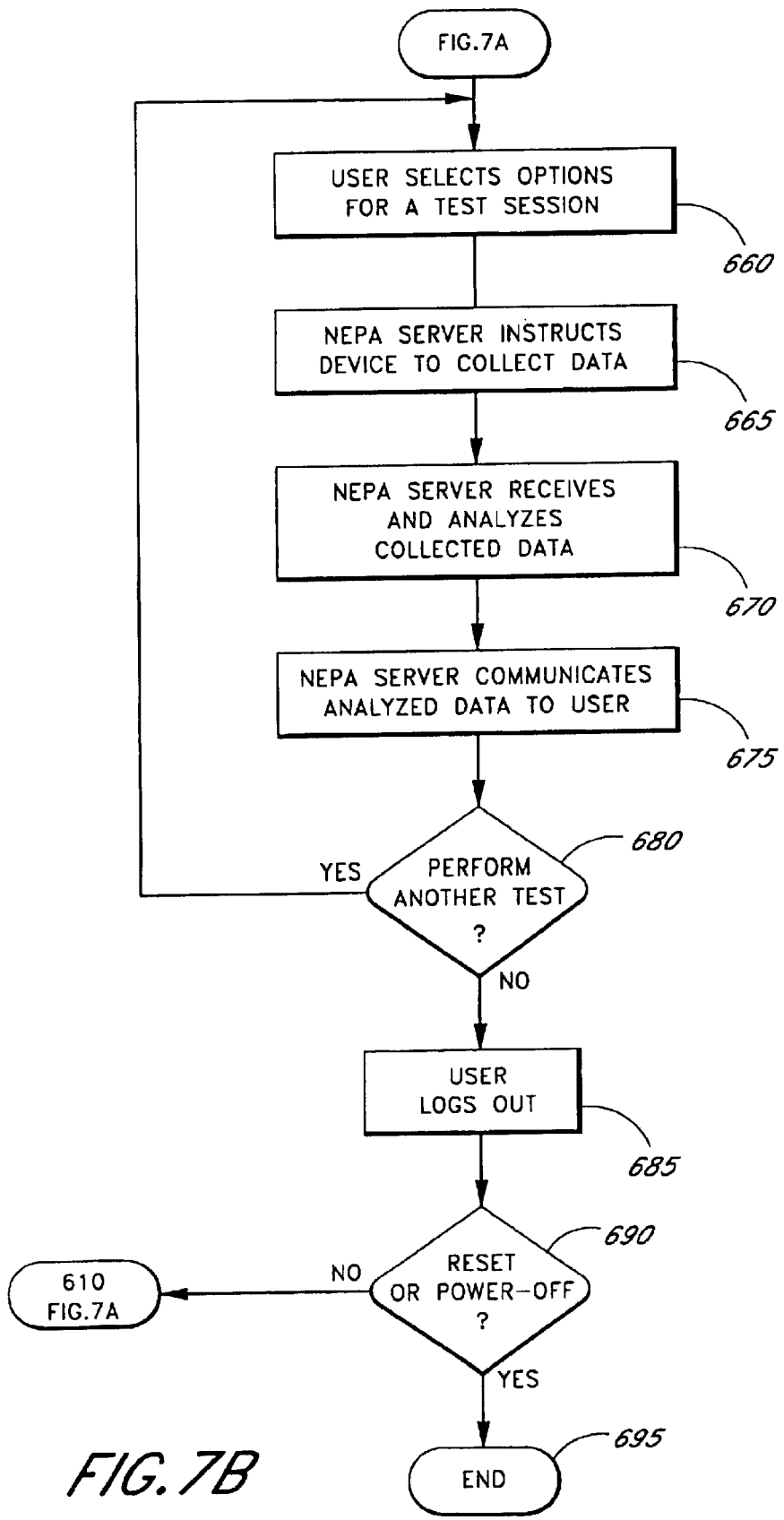

FIG. 7B is a continuation of the flowchart of FIG. 7A. At block 660, to perform a test session, the operator selects one or more options which are available in the displayed application tool. At block 665, and pursuant to the operator's entered selections, the NEPA server 210 instructs one or more NEPA access devices to collect network data for analysis. The NEPA access devices collect the requested network data and forward the collected data to the NEPA server 210 via the communications network 220. As noted above (FIG. 4), a NEPA access device communicates with the NEPA server 210 using SNMP via the communications network 220. At block 670, the NEPA server 210 receives and analyzes the collected data in accordance with the selected NEPA application. The NEPA server 210 may optionally store the collected data in its main or external memory (e.g., hard disk drive) to perform another kind of analysis, or for later retrieval by the operator. At block 675, the NEPA server 210 forwards and displays the analyzed network data to the operator at the NMC 230.

At block 680, the NEPA server 210 determines if a further test is requested by the operator. If more test are desired by the operator, the process returns to block 660. If no more tests are desired by the operator, the operator may log off the NEPA server 210 at block 685. At block 690, the NEPA server 210 determines if a reset or power-off action is requested. If so, the NEPA server 210 terminates the test sessions at block 695. If no power-off or reset is requested, the NEPA server 210 returns to block 610 to wait for the next operator log-on.

Figure 8:
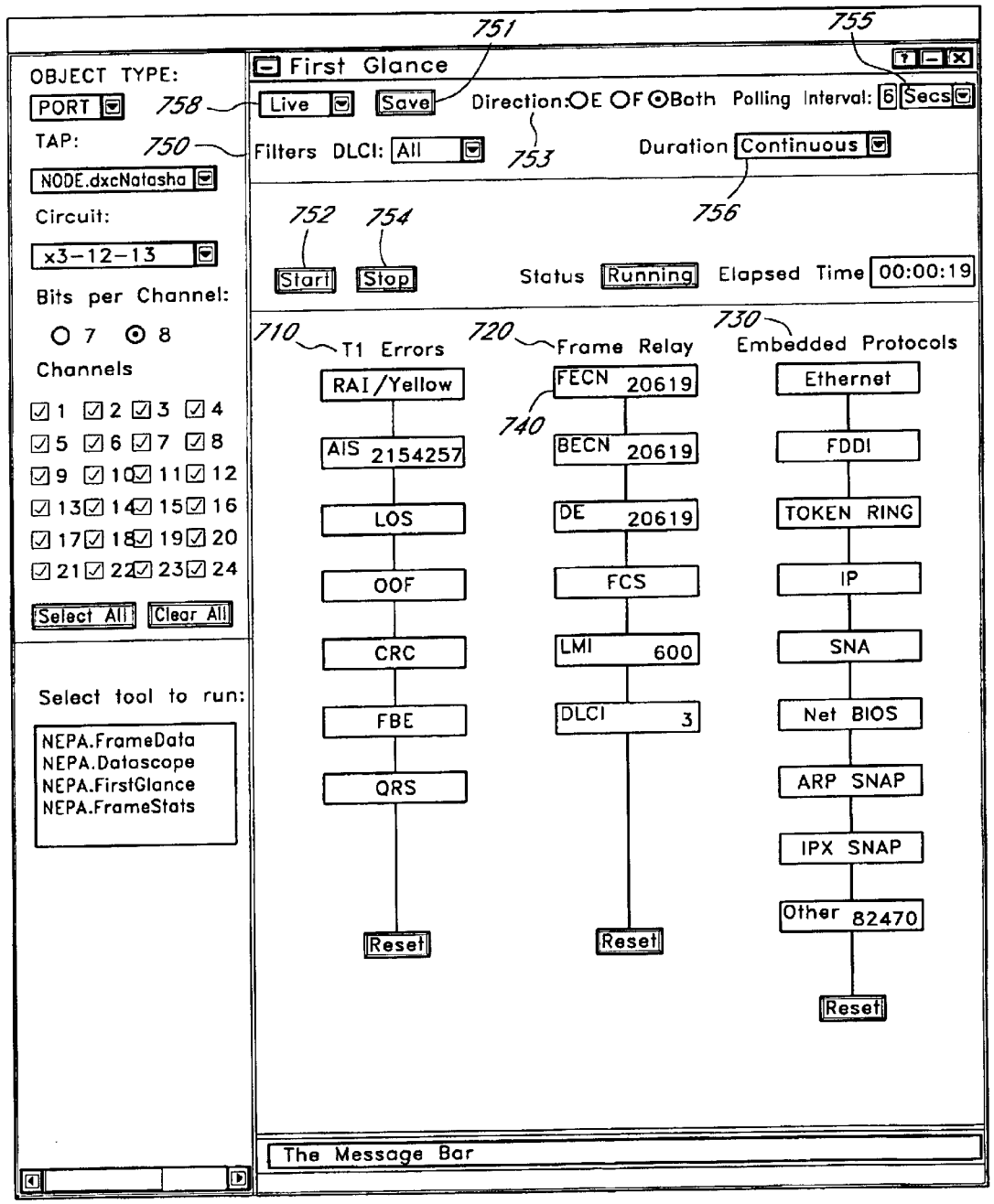
FIG. 8 is a first glance analysis screen display generated on the client computer shown in FIG. 2.

FIG. 8 is an exemplary screen display corresponding to a first glance analysis performed by the NEPA server 210. The screen display would be presented to an operator at the NMC 230 or the NEPA server 210. As explained above, there are several applications which the NEPA server 210 employs to perform its analytical functions. One of these applications is the first glance tool. The first glance tool is a graphical user interface (GUI) application which displays on-going status of various physical and logical layers in a network link of the NUE 290. The first glance application provides an operator with a view of T1 710, frame relay 720, and embedded protocol statistics 730. For instance, in examining a T1 frame relay link, the first glance status information on the T1 signal, such as out of frame (OOF), cyclic redundancy check (CRC), and loss of signal (LOS) events. In one embodiment, the first glance application employs a color-coded scheme when displaying the status information of the network link, such as red, yellow, purple, and green indicators. An operator may click on these indicators to obtain additional statistical data or an explanation of event.

When running the first glance application, the NEPA server 210 may acquire the first glance information from the MIB 340 (FIG. 4) during predefined time intervals (e.g., every 30 seconds). First glance displays to the operator the acquired information as it arrives. For instance, the frame count 740, shown in the lower portion of each indicator box, increases with time, and the indicator may change color to reflect the change in count accordingly. The operator may reset the count which causes the indicator colors to return back to a default color indicating a new start. Finally, an operator may click on a particular indicator box to change the display to the frame data application which is discussed below.

Generally, a NEPA Toolkit application, such as first glance, includes a MIB collection bar 750 which controls the collection mechanism of the PAE 320. For example, the operator may start and stop a collection session by clicking on a start 752 or stop 754 button, respectively. Additionally, the operator may select a live or file mode for the analysis by selecting the desired mode field 758. In live mode, the data is collected and displayed in real-time, or substantially near real-time. The operator may stop a live mode and save the collected data to a file stored in the operator's computer for later analysis by clicking on the save icon 751. In file mode, the operator may select a file for analyzing historical data. Moreover, the operator may indicate the link direction by specifying the E/F (incoming/outgoing data stream), or both in the direction field 753. The operator may indicate the polling interval by specifying the interval in seconds in the polling interval field 755. The operator may specify no filtering of data link connection identifiers (DLCIs) by specifying "all", DLCI filtering is desired by specifying DLCI, or filtering a specific DLCI by specifying "one" in the filters field 757. Finally, the operator may specify a duration of the collection of data by specifying continuous or timed in the duration field 756. By selecting continuous duration, the operator may collect data continuously. By selecting the timed duration, the operator may collect data for a predetermined duration of time specified in hours, minutes, and seconds.

Figure 9:
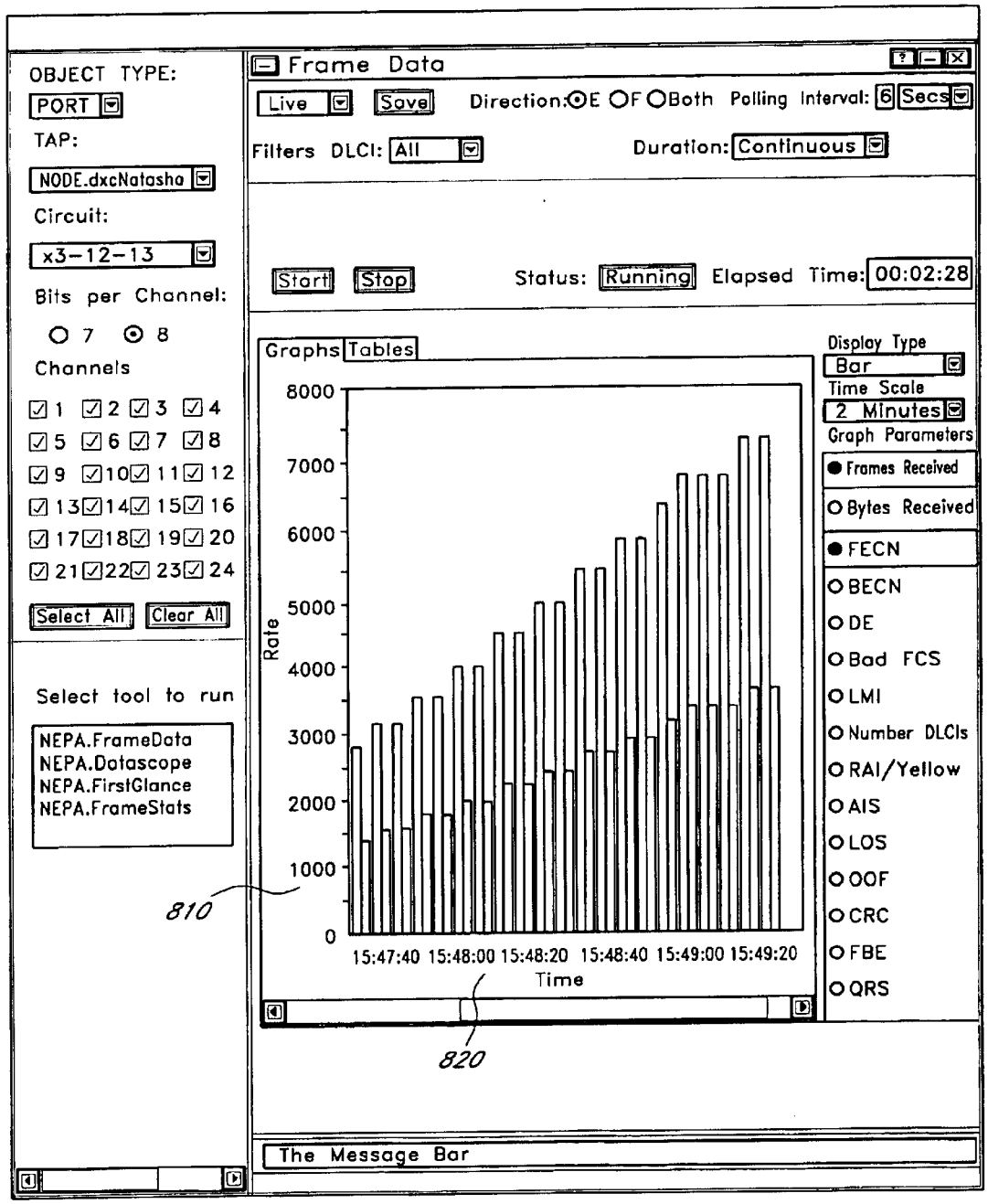
FIG. 9 is a frame data screen display generated on the client computer shown in FIG. 2.

FIG. 9 is an exemplary screen display corresponding to a frame data analysis performed by the NEPA server 210. The screen display would be presented to an operator at the NMC 230 or at the NEPA server 210. The frame data software tool provides a historical overview in graphical or tabular form of specific frame relay MIB values. Examples of MIB values include number of frames or bytes received, forward or backward explicit congestion notification (FECN or BECN), discard eligibility (DE), bad frame check sequence (FCS), local management interface (LMI), number of DLCI, and others. The frame data application plots one or more MIB values (y-axis 810) as a function of time (x-axis 820). As new data arrive from the MIB 340, the NEPA server 210 updates the graphical display dynamically. Historical data for extended time intervals may also be displayed, if such data were previously collected and still available in the memory of the NEPA server 210.

Figure 10:
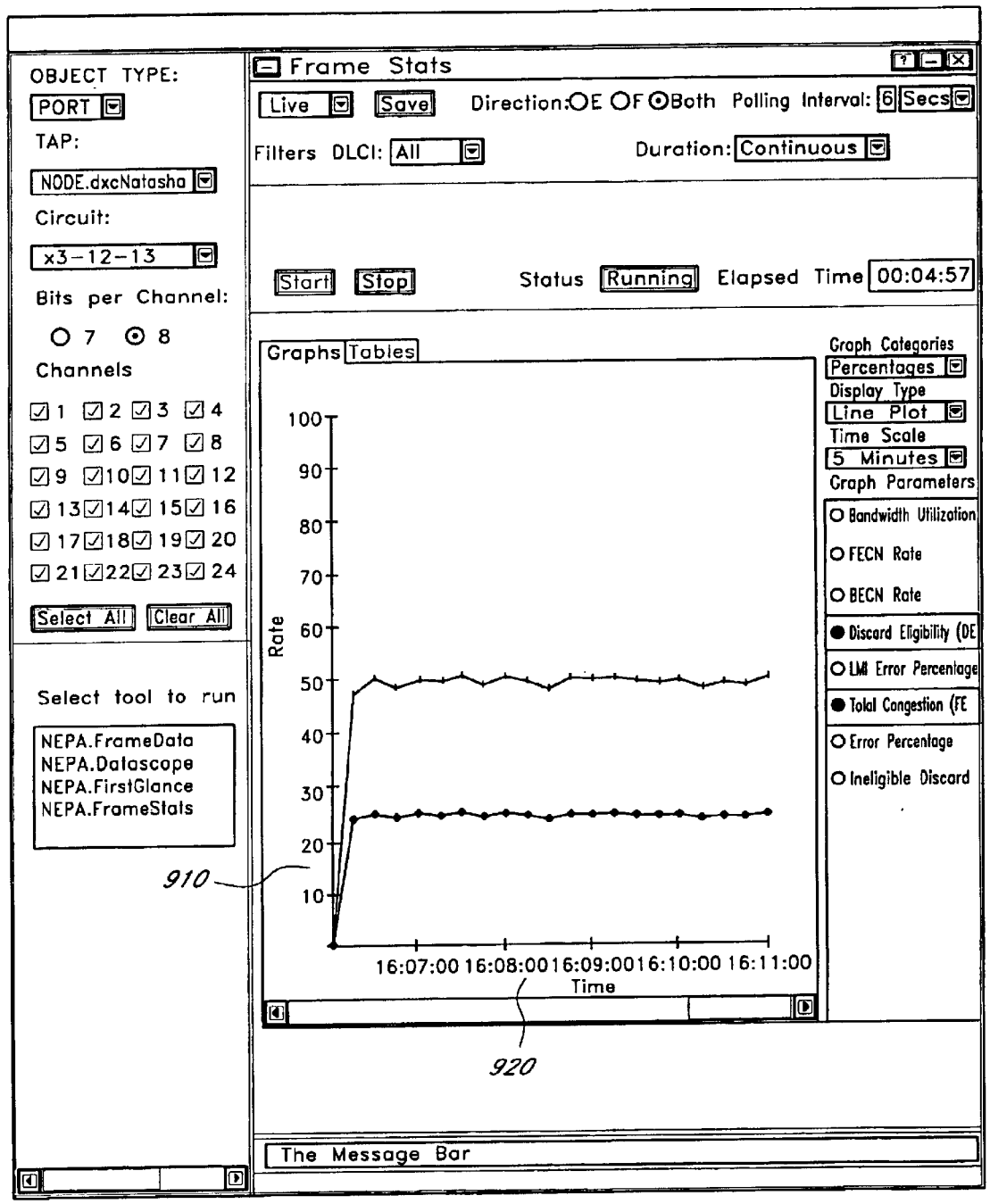
FIG. 10 is a statistical analysis screen display generated on the client computer shown in FIG. 2.

FIG. 10 is an exemplary screen display corresponding to a statistical analysis performed by the NEPA server 210. The screen display would be presented to an operator at the NMC 230 or at the NEPA server 210. The statistical analysis is performed by the frame stats software tool to provide an operator with graphical or tabular analysis of user-specified algorithms. These algorithms use raw data collected in the MIB 340 at regularly scheduled time intervals. These algorithms perform estimation of bandwidth utilization, FECN and BECN rates, DE rate, LMI error percentage, total congestion rate, and others. The frame stats application displays results of a desired algorithm in percentage form (y-axis 910) as a function of time (x-axis 920).

Figure 11:
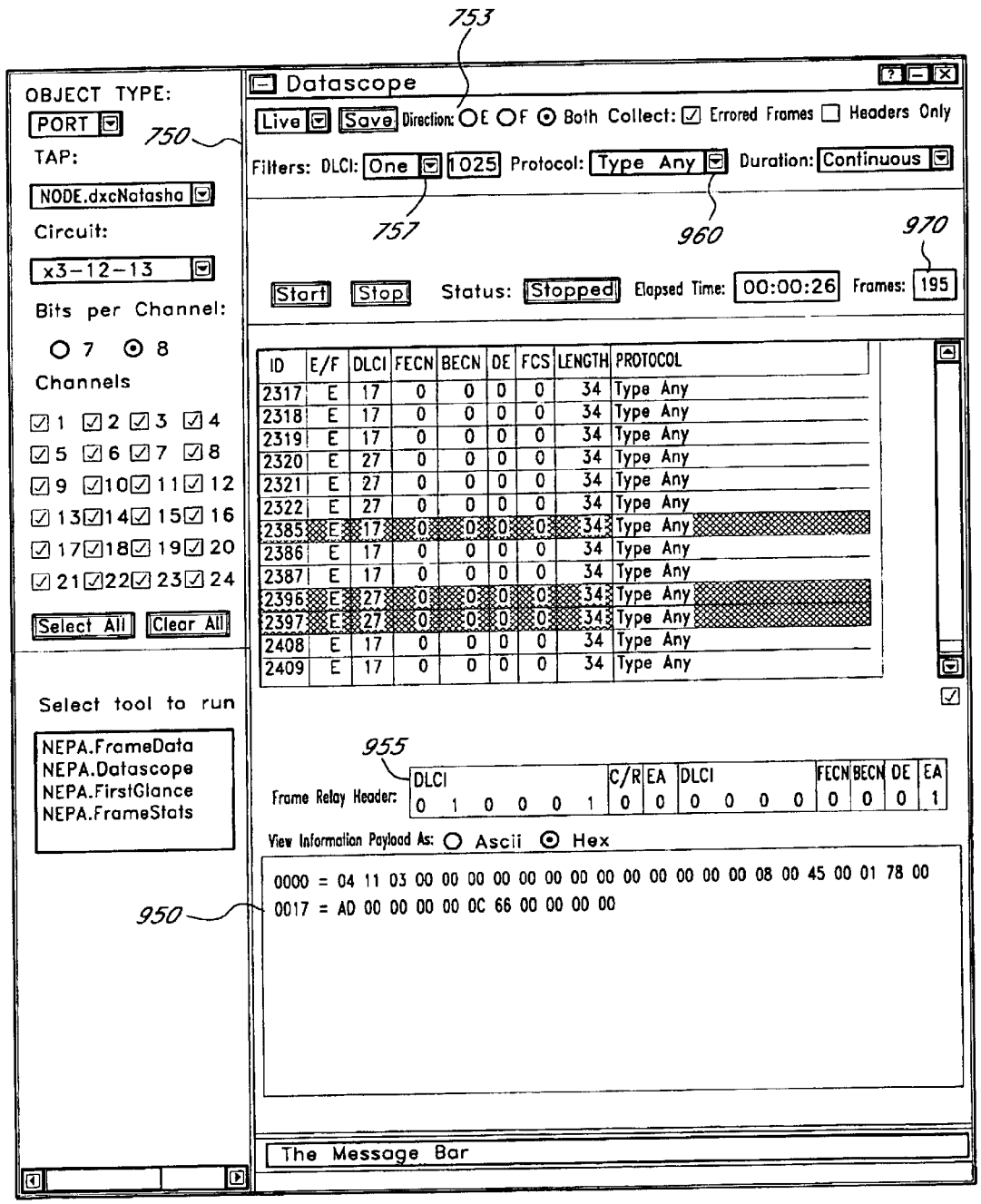
FIG. 11 is a data analysis screen display generated on the client computer shown in FIG. 2.

FIG. 11 is an exemplary screen display corresponding to a datascope analysis performed by the NEPA server 210. The screen display would be presented to an operator at the NMC 230 or at the NEPA server 210. The datascope software tool provides an operator with a view of bit streams of live frames. A like frame viewing capability is provided by conventional protocol analyzers. The NEPA access device provides the NEPA server 210 with a live "feed" of raw frame relay data on one or more network links of the NUE 290.

As shown in FIG. 11, the screen provides an operator with several datascope fields in real-time, or substantially near real-time, including ID, E/F, DLCI, FECN, BECN, DE, FCS, Length, and Protocol. The ID field identifies the frame number being displayed. The E/F field identifies the direction of the frame in the network link. The DLCI field identifies the DLCI of the frame, which is a unique number assigned to an end point of a permanent virtual channel (PVC) in a frame relay network. The FECN field comprises a bit set used in a frame relay network to direct a destination device, such as a data terminal equipment (DTE), to initiate congestion avoidance procedures. The BECN field comprises a bit set which directs a source device to initiate congestion avoidance procedures. The DE field comprises a bit set which indicates that a frame may be discarded in preference to other frames. The FCS field comprises a standard 16-bit CRC used for a high level data link control (HDLC) and frame relay frames. The Length field specifies the length of the frame in bits. Finally the protocol field specifies the signal protocol being examined.

An operator may view a bit stream in binary, decimal, hexadecimal, or ASCII formats in the view information field 950. Frame relay headers are displayed in binary format in the frame relay header field 955. The operator may click on a particular frame to view its respective header and payload information. The operator may also scroll up and down to view various frame information. The operator may set filter options by specifying DLCI or protocol type in the filters field 757, or direction in the direction field. Finally, in contrast with the other NEPA applications, the MIB collection bar 750 in the datascope application further includes a protocol field 960 and a frames field 970. The protocol field 960 specifies the signal protocol being examined. In effect, the protocol field 960 allows an operator to filter out frames which do not conform to the selected protocol. The operator may choose "Any Type" to disable the protocol filtering. Alternatively, the operator may specify a protocol such as Ethernet, IP, SNA, ATM, frame relay, frame relay multi-protocol, or bridging protocols. The frames field 970 provides a frame count of the collected frames.

As noted above, based on the user profile, the NEPA server 210 determines which NEPA application, and which application options, to provide to the operator. For example, the NEPA application may provide an operator with access to the datascope application. The datascope application uses user profile information to determine whether to restrict or allow the operator to view a datascope option, such as the header or payload information, view headers without a filter, and which filters are permitted.

The NEPA server 210 also provides a traffic-injection application which allows an operator to insert frame relay data (header and payload) into a network link. The traffic-injection application allows emulation of or replacing a link. Additionally, the traffic-injection application allows frame injection or addition into a network link. The operator specifies a frame to be injected by setting individual bits within the header and length of random payload data. The frame is injected a specified number of times using a predetermined CRC error rate. The NEPA access device simulates errors by providing an incorrect CRC number to egress frames. The traffic-injection application displays the total number of frames and corrupted frames in real-time, or substantially near real-time.

Therefore, the invention permits ubiquitous access to a NUE 290 without the need for investment in skilled technicians and expensive hardware or test equipment. The operator may have simultaneous access to multiple points across the network from a single NMC 290.

In view of the foregoing, it will be appreciated that the invention overcomes the long-standing need for a system and method of analyzing multiprotocol networks from a single site. The invention eliminates the need for dispatching technicians and expensive equipment to network boundaries to determine the source of a network malfumction. The invention may be embodied in other specific forms without departing from its spirit or essential characteristics. The described embodiment is to be considered in all respects only illustrative and not restrictive. The scope o f the invention is, therefore, indicated by the appended claims rather by the foregoing description. All changes which fall within the meaning and range of equivalency of the claims are to be embraced within their scope.

What is claimed is:

1. A system for analyzing a first communications network, the system comprising:
   a device collecting data from the first network;
   a server computer in data communication with the device via a second communications network, wherein the server computer executes an application to analyze data protocol; and
   a client computer configured for communicating with the server computer over the second communications network.

2. The system as defined in claim 1, wherein the first communications network comprises a public switched telephone network.

3. The system as defined in claim 1, wherein the second communications network comprises the Internet.

4. The system as defined in claim 1, wherein the device comprises a test access unit having a server-compatible access module.

5. The system as defined in claim 1, wherein the server computer comprises a web server which analyzes the data collected from the network under examination.

6. The system as defined in claim 5, wherein the server computer communicates the analyzed data to the client computer for evaluation.

7. The system as defined in claim 5, wherein the server computer analyzes a logical layer and physical layer of the first communications network to determine the source of a malfunction in the first communications network.

8. The system as defined in claim 1, wherein the device allows non-intrusive access to the first communications network.

9. The system as defined in claim 1, wherein the server computer instructs the device to perform at least one of monitoring, non-intrusive testing, intrusive testing, traffic-injection, and protocol analysis of the first communications network conforming to at least one of a frame relay, ATM, TCP/IP, ISDN, and FDDI protocols.

10. The system as defined in claim 1, wherein the client computer is located remotely to the server computer.

11. The system as defined in claim 1, wherein the client computer comprises a computer having a web browser which communicates with the server computer via the Internet.

12. The system as defined in claim 1, wherein the server computer includes a list of user profiles which is consulted for restricting access to the first communications network.

13. The system as defined in claim 1, wherein the device provides access to the first communications network in-line.

14. The system as defined in claim 1, wherein the device provides access to the first communications network via a test access point.

15. A system for analyzing a public switched communications network, the system comprising:
   an access device collecting data from the public switched communications network;
   a server computer receiving the collected data from the access device via the Internet, and executing at least one application to perform protocol analysis based on the received data; and
   a client computer executing a Web browser to communicate with the server computer via the Internet and access the outcome of the protocol analysis.

16. A method of analyzing a first communications network, the method comprising:
   collecting data from at least one link in the first communications network;
   accessing the collected data via a second communications network;
   performing a protocol analysis of the accessed data using a server computer; and
   communicating the outcome of the protocol analysis to a client computer via the second communications network.

17. The method as defined in claim 16, wherein the step of collecting data includes accessing the first communications network via a test access point.

18. The method as defined in claim 16, wherein the step of collecting data includes accessing the first communications network in-line.

19. The method as defined in claim 16, wherein the step of performing a protocol analysis includes conducting protocol analysis of at least one of a frame relay, ATM, TCP/IP, ISDN, and FDDI protocols.

20. The method as defined in claim 16, wherein the step of performing a protocol analysis includes executing at least one network application by the server computer.

21. The method as defined in claim 16, wherein the step of communicating the outcome includes executing a web browser to access the server computer via the Internet.

* * * * *